United States Patent [19]

Gedert

[11] Patent Number: 5,459,985

[45] Date of Patent: Oct. 24, 1995

[54] SPHERICAL LINE TRIMMER SUPPORT

[76] Inventor: Leon J. Gedert, 7442 S. Dixie, Erie, Mich. 48133

[21] Appl. No.: 226,019

[22] Filed: Apr. 11, 1994

Related U.S. Application Data

[63] Continuation-in-part of Ser. No. 729,193, Apr. 2, 1991, Pat. No. D. 347,368.

[51] Int. Cl.⁶ .............................. A01D 34/74; A01D 34/84
[52] U.S. Cl. .................... 56/17.2; 56/16.7; 30/296.1
[58] Field of Search .......................... 56/12.7, 16.7, 56/172; 30/276, 296.1; D8/8; D10/69

[56] References Cited

U.S. PATENT DOCUMENTS

| | | | |
|---|---|---|---|
| D. 298,220 | 10/1988 | Lasiter | D10/82 |
| D. 318,243 | 7/1991 | Piskula | D10/69 |
| D. 332,753 | 1/1993 | Jones | D10/69 |
| D. 347,368 | 5/1994 | Gedert | D8/8 |
| 2,952,483 | 4/1976 | Masterson | 56/17.2 |
| 3,971,196 | 7/1976 | Stevenson | 56/17.1 |
| 4,306,406 | 12/1981 | Fulkerson et al. | 56/13.5 |
| 4,829,676 | 5/1989 | Waldron | D10/69 X |
| 4,845,929 | 7/1989 | Kawasaki et al. | 56/12.7 X |
| 4,873,819 | 10/1989 | Shivers et al. | 56/17.5 |
| 4,922,694 | 5/1990 | Emoto | 56/17.2 X |
| 5,095,687 | 3/1992 | Andrew et al. | 56/12.7 |
| 5,279,102 | 1/1994 | Foster | 56/12.7 |
| 5,317,807 | 6/1994 | Pulley | 56/12.7 X |

FOREIGN PATENT DOCUMENTS

| | | | |
|---|---|---|---|
| 222515 | 5/1987 | European Pat. Off. | 56/12.7 |

*Primary Examiner*—George A. Suchfield
*Attorney, Agent, or Firm*—Philip J. Pollick

[57] ABSTRACT

A support for a line trimmer features a rotatable sphere held by a set of tines that allows for free rotation of the sphere in any direction. A line orientation indicator is also used to indicate the position of the rotation line of the line trimmer with respect to horizontal. The support is attached to the trimmer with a set of telescoping tubes that allow for easy adjustment of the height of the cut of the trimmer. A trimmer securing device allows for easy and quick attachment of the support and line orientation indicator to the line trimmer.

14 Claims, 3 Drawing Sheets

SPHERICAL LINE TRIMMER SUPPORT

This is a continuation-in-part of my prior application Ser. No. 07/729,193, filed Apr. 2, 1991, now U.S. Pat. No. D. 347,368, which is herein incorporated by reference as if completely written herein.

BACKGROUND OF THE INVENTION

1. Field of the Invention

This invention pertains to a support for a vegetation line trimmer and more particularly to a support using a fully-rotatable, spherical ball for easy movement over the supporting surface.

2. Background of the Invention

A wide variety of vegetation trimmers that utilize a rotating string or line are currently available in the marketplace. These devices are typically referred to by many names including Weed Eaters, Weed Whackers, line trimmers, string trimmers, and line-type vegetation trimmers. Hereinafter and for the purposes of this invention, they are referred to as line trimmers or trimmers.

Such trimmers are typically powered by an electric or gasoline engine. The line trimmer consists of a downward facing rotating head covered by an arcuate line shield with a down-turned flange at its radially outermost end. The head and shield are mounted at the lower end of a tubular shaft having one or more handles at or near its upper end. The power source may be located anywhere along the tubular shaft but is typically located at the end away from the trimmer head. The line trimmer is designed so that the line rotates in a generally horizontal plane about a vertical axis.

Typically the line trimmer is completely supported by the operator. That is, no part of the line trimmer is designed for contact with a supporting surface or object. Because of this lack of support, conventional line trimmers are a source of muscle strain, especially for individuals not used to a large amounts of physical activity.

To remedy this problem, several attempts have been made to provide support for the line trimmer. Shivers et al. (U.S. Pat. No. 4,873,819) has completely redesigned the grass trimmer to include a structural support frame with a single ground engaging wheel connected to the frame with the trimmer portion positioned to rotate around the wheel. Foster (U.S. Pat. No. 5,279,102) uses a large wheel requiring a handle for use in guiding the carriage when it is attached to the line trimmer. Andrew et al. (U.S. Pat. No. 5,095,687) provides a wheeled attachment that is connected to the line shield and to the shaft of the trimmer.

Wheeled devices such as those used by Andrew and Shivers et al. tend to lodge in small ruts and divets typically found in the area to be trimmed resulting in forced and jerky motions of the trimmer requiring considerable force to free them from their bound position. Also, because these devices pivot or turn on at least two different axes, they are extremely susceptible to binding as a result of vegetation cuttings becoming entangled in the pivoting mechanisms by which the wheel turns and rotates. Foster attempts to alleviate this problem by providing a rather substantial wheel which, because of its size, presents its own weight and steering problems which result in the need for a separate guide handle for guiding the apparatus. All of the devices rely on the operator's skill and sense in providing a level cut. None of these devices or the line trimmers themselves provide a visual indicator as to whether the cutting line is in a horizontal cutting position. As a result, the vegetation height can vary considerably, often giving an unsightly appearance to the vegetation after it has been trimmed.

SUMMARY OF THE INVENTION

It is an object of this invention to provide a simple, low cost, support that readily traverses its supporting surface, avoids clogging and inoperability as a result of cut vegetation, clogging its mechanism, and a device which can be readily cleaned when such vegetation does enter into the support mechanism. The device features a rotating ball or sphere which is releasably engaged in two or more downwardly projecting tines. This has the advantage of allowing the sphere to rotate freely in any direction within its downwardly extending tine cage. The sphere can readily be removed from the tines for easy cleaning.

The support also features telescoping tubes that are secured to each other by means of mating apertures and a nut and bolt. This has the advantage of easy and readily adjustment of the line trimmer to any height. The line trimmer support also features a visual indicator such as a level. This has the advantage of indicating to the operator the horizontal position of the rotating line and obviates the need to constantly judge whether, in fact, the line is rotating in an essentially horizontal position and allows the operator to obtain an even vegetation cut.

The invention also features an attachment structure for attaching the spherical support, or the line level indicator, or both, by means of an attachment clamp which fits over and is secured to the shaft of the line trimmer with a suitable fastening device. This has the advantage of easy removal and attachment of the support and level to the line trimmer.

The foregoing and other objects, features and advantages of the invention will become apparent from the following disclosure in which one or more preferred embodiments of the invention are described in detail and illustrated in the accompanying drawings. It is contemplated that variations in procedures, structural features and arrangement of parts may appear to a person skilled in the art without departing from the scope of or sacrificing any of the advantages of the invention.

Figure 1:
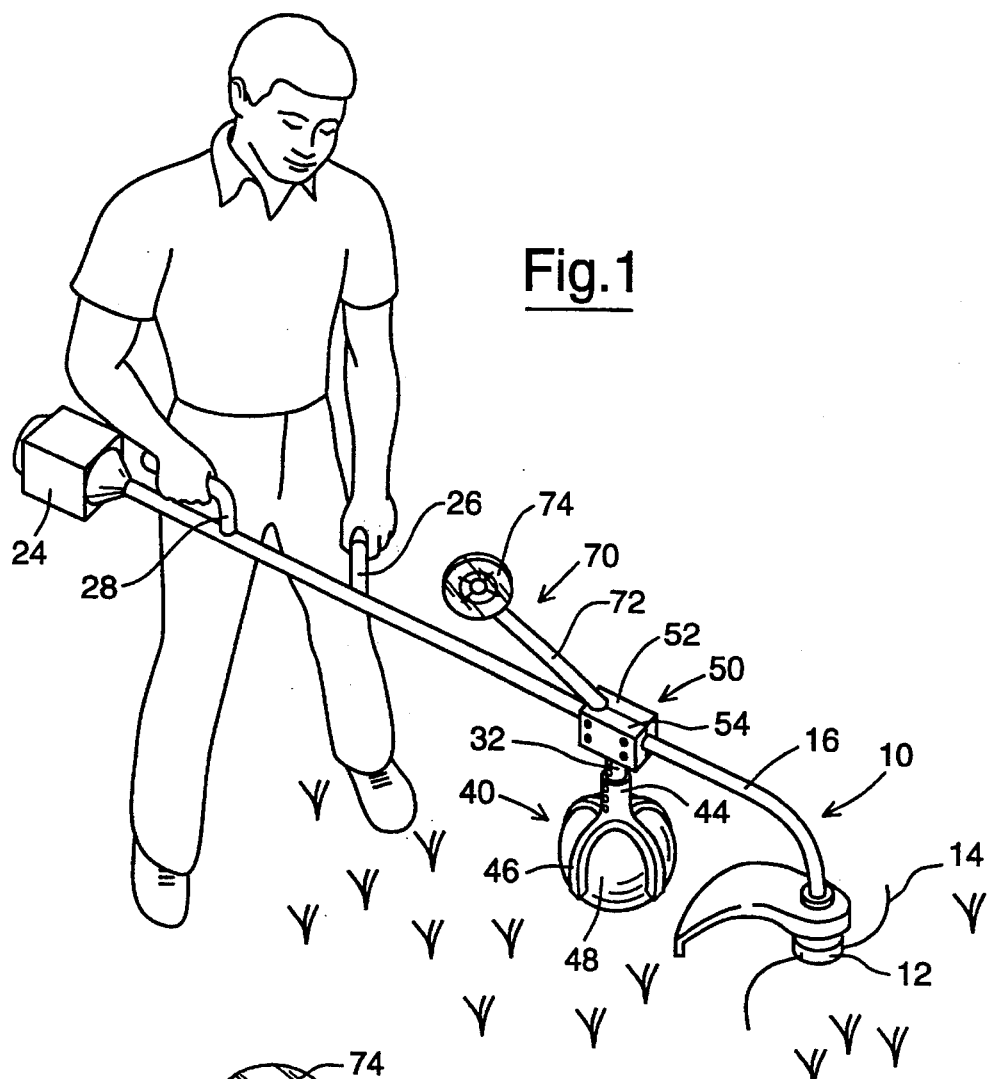
FIG. 1 is a perspective view of the use of the spherical line trimmer support and a line trimmer, line position (orientation) indicator in conjunction with a line trimmer.

In describing the preferred embodiment of the invention which is illustrated in the drawings, specific terminology is resorted to for the sake of clarity. However, it is not intended that the invention be limited to the specific terms so selected and it is to be understood that each specific term includes all technical equivalents that operate in a similar manner to accomplish a similar purpose.

Although a preferred embodiment of the invention has been herein described, it is understood that various changes and modifications in the illustrated and described structure can be affected without departure from the basic principles that underlie the invention. Changes and modifications of this type are therefore deemed to be circumscribed by the spirit and scope of the invention, except as the same may be necessarily modified by the appended claims or reasonable equivalents thereof.

DETAILED DESCRIPTION OF THE INVENTION AND BEST MODE FOR CARRYING OUT THE PREFERRED EMBODIMENT

Figure 3:
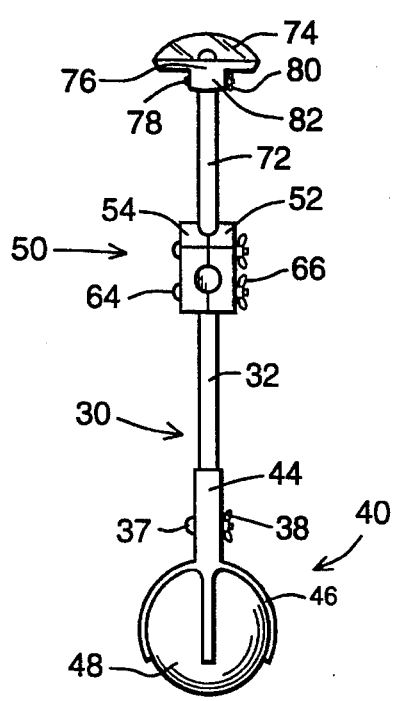
FIG. 3 is a front view of the line trimmer support and line orientation indicator in conjunction with the line trimmer attaching device.
Figure 2:
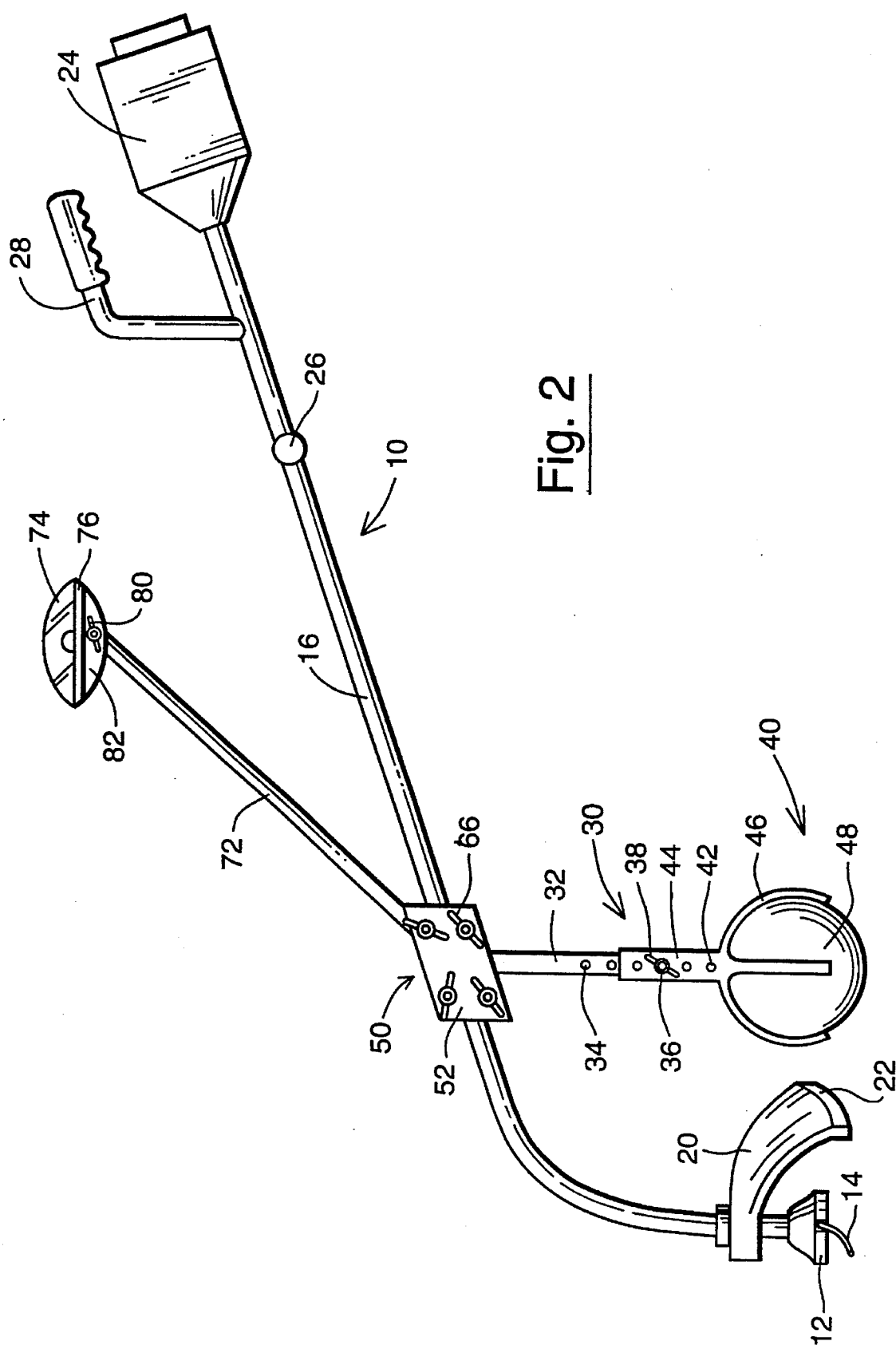
FIG. 2 is a side view of a line trimmer with attached spherical line trimmer support and line orientation indicator.

With reference to the drawings and initially FIG. 1–3, a spherical support device 40 is shown for supporting line trimmer 10. In its basic form, line trimmer 10 consists of rotating head 12, rotating line 14 appropriately fed by head 12, a shield 20 typically with a downturned flange 22, a shaft 16, a power source 24 for turning rotating head 12, and one or more handles such as handles 26 and 28. Device 40 has a longitudinal support shaft 44 attached to line trimmer 10 at one end with arcuate tines 46 that extend downward from the other end. These tines are shaped and positioned to accept and retain a ball (sphere) 48 that rotates freely in any direction in its supporting tine cage. Although the present invention contemplates the use of at least three tines, it is to be recognized that only two tines are necessary providing that these tines are wide enough and have an interior curvature sufficient to capture, rotationally hold, and release sphere 48.

A minor portion of sphere 48 extends below the second (unattached) ends of the tines sufficiently to allow sphere 48 to roll over the ground and vegetation without the vegetation becoming entangled in tines 46. Typically ball 48 is at least the size of a regulation volleyball. The tines, their method of attachment, or both allow for the free ends of tines 46 to be spread apart sufficiently to insert or withdraw ball 48 from the confining space (cage) formed by tines 46. Preferably support shaft 44 and the tines 46 are formed in one piece from a resilient plastic material or metal that allows sphere 48 to be readily inserted and withdrawn from the open-ended tine cage.

For ready adjustment of the height of trimmer head 12 and rotating line 14, the spherical support device 40 is attached to trimmer 10 by means of first and second telescoping shafts, the first shaft or tube being designated by numeral 44 and the second shaft by numeral 32. Second shaft 32 has a smaller diameter than the interior diameter of tube 44 so as allow shaft 32 to slide easily within the interior of tube 44 so as to allow the tube 32 to telescope within tube 44. That is, by insert or withdrawing tube 32 from the interior of tube 44, the total length of the support shaft 30 can be varied so as to control the height of head 12 and cutting line 14 above ground level.

Shaft 32 has one or more apertures 34 therein. Shaft 44 also has apertures 42 formed therein. Apertures 32 and 44 align with each other to receive a securing device 36 such as bolt 37 and nut such as wing nut 38. A wide variety of securing devices for locking to telescoping tubes are known in the art such as detents, cotter pins, and the like and are contemplated by this invention. It is to be noted that only one of the shafts is required to have multiple apertures while the remaining shaft need only have a single aperture to allow for adjustment of shaft 30 to various lengths.

Although shaft 32 is shown as extending into shaft 44, it is to be realized that if shaft 44 is totally open throughout its length, shaft 32 could extend therethrough and force sphere 48 from its secured position within tines 46. As such, the lower end of shaft 44 may be closed or otherwise provided with a stop to prevent such penetration by shaft 32. However extension of the lower end of shaft 32 through the lower end of shaft 44 does have the advantage of providing a ready means of dislodging sphere 48 from its tine cage for cleaning and easy access.

Alternatively, shaft 32 can be made shorter than shaft 44 in order to prevent the extension of shaft 32 through shaft 44 so as to dislodge sphere 48. It is also possible to construct shafts 32 and 44 so that shaft 44 extends inside of the bore of shaft 32 thereby allowing tines 46 to serve as a stop for outer shaft 32.

Shaft 30, shown as comprising shafts 32 and 44, is secured to line trimmer 10 by means of securing device 50. As shown in FIGS. 1 and 3, securing device 50 is composed of two plates 52 and 54. These plates have grooves formed on their inner surfaces to accommodate the line trimmer shaft 16, the upper end of support shaft 32, and the lower end of level shaft 72. As shown in FIG. 3, the grooves are semicircular in shape to accommodate the circular shape of shafts 16, 32 and 72. However, it is to be understood that other accommodating shapes would be used when the shafts have a different shape, e.g., square, hexagonal, etc.

Figure 4:
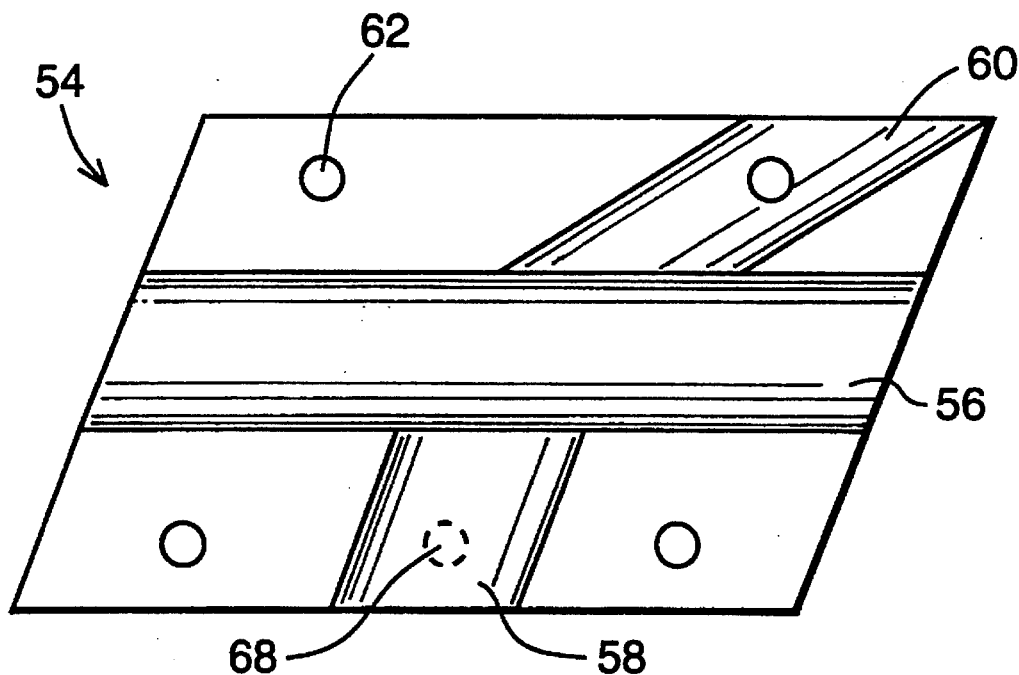
FIG. 4 is a side view of the interior surface of a plate from the line trimmer attaching device used to fasten the spherical line trimmer support to the line trimmer shaft.

FIG. 4 shows the inner surface of plate 54 with the appropriate grooves located therein. Groove 56 accommodates shaft 16 of line trimmer 10, grove 58 accommodates the upper end of support shaft 32, and groove 60 supports the lower end of level shaft 72. Aligning apertures 62 in plates 52 and 54 allowed the plates to be secured to the various shafts to hold the various shafts securely in place and in fixed relation with each other. As seen in FIG. 3, plates 52 and 54 may be secured to each other with an appropriate securing device such as bolts 64 that extend through aligning apertures 62 and nuts such as wing nuts 66. As seen in FIG. 4, one of the apertures 62 is located in grove 60. By forming an aligning aperture in the lower end of shaft 72 (not shown), shaft 72 is further secured to fastening device 50 with bolt 64 and wing nut 66 so as to prevent it slipping out of securing device 50. Similarly, an aperture 68 (shown in phantom) can be located in grove 58 to secure the upper end of shaft 32 by means of an aligning aperture in shaft 32 and an appropriate securing device such as a nut and bolt.

As shown in FIG. 2, securing device 50 can be moved along shaft 16 and secured along shaft 16 at any appropriately selected position. Since shaft 16 slants up from the ground, it is possible to construct shaft 30 as a single piece, e.g. using only shaft 44, and allow height adjustment of support sphere 48 to be made by sliding securing device 50 along shaft 16 and securing it to shaft 16 when the appropriate height is reached.

A wide variety of securing devices such as device 50 are contemplated by this invention including a wide variety of modifications to device 50. Thus the upper end of shaft 32 and the lower end of shaft 72 could be permanently affixed to one of the plates 52 or 54 by welding of other suitable means or even formed as one piece from a suitable metal or engineering plastic.

As shown, this invention is designed as a retrofit device to be used with existing line trimmers. However, it is to be understood that this invention can be incorporated into the design of new line trimmers. Thus shafts 16, 32 (or 30 with tines 46) and 72 could be formed as a single piece, requiring only the insertion of sphere 48 into the tine cage and the attachment of level base 76 with attached level 74 to shaft 72 to complete assembly. In addition to the securing device shown, this invention also contemplates other line trimmer shaft securing devices such as that shown in U.S. Pat. No. 5,095,687 (Andrews, et al) all of which is incorporated herein by reference as if completely written herein.

Figure 5:
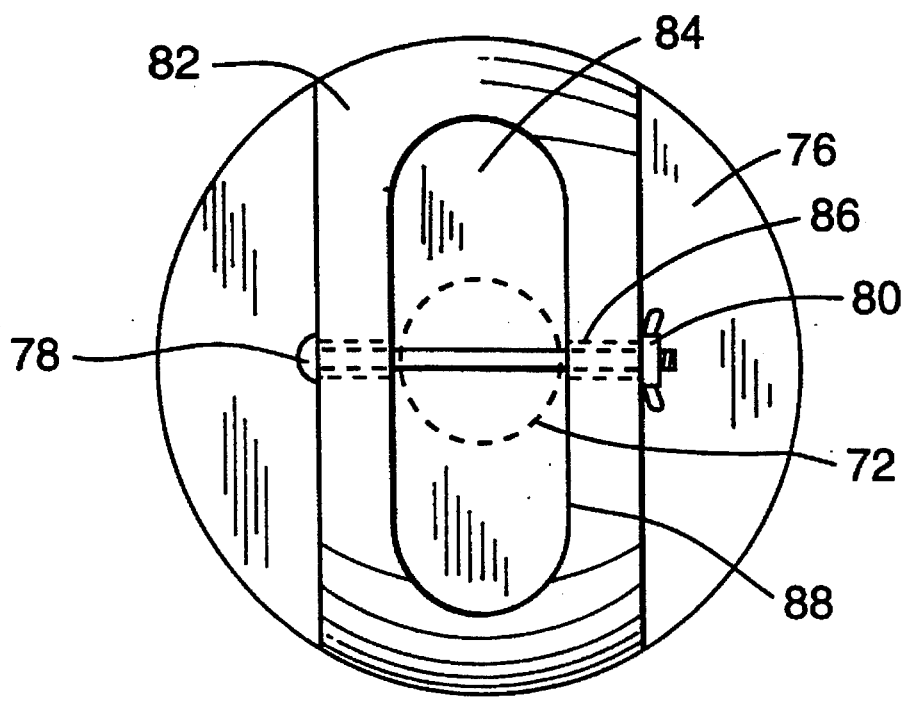
FIG. 5 is a bottom view of the base of the line trimmer line position indicator.

This invention also contemplates the use of a line trimmer, line orientation (position) indicator 70 attached to line trimmer 10. The line trimmer, line-orientation indicator 70 consists of an indicator such as a circular or "bulls-eye" level 74 for indicating when line 14 is rotating in a circular plane. Level 74 is mounted on base 76 which in turn is secured to level indicator shaft 72 by means of a suitable securing device such as bolt 78 and a nut such as wing nut 80. As shown in FIGS. 2, 3 and 5, base 76 has a downward extending projection 82 that has slot 84 formed therein to receive the upper end of level shaft 72 (indicated in phantom). The upper end of shaft 72 in secured to base 76 by means of a fastening device such as bolt 78 and wing nut 80 that passes through aligning apertures 86 in projection 82 and an aperture (not shown) in the end of shaft 72. This allows the end of shaft 72 to rotate about bolt 78 so as to position it so that a level indication by level 74 corresponds to rotation of line 14 in a horizontal plane. Downward projection 82 is of a resilient material so that the inner walls 88 of projection 82 that form slot 84 move inward to secure base 82 to shaft 72 and prevent rotation about bolt 78 when the correct orientation of level 74 is achieved. Such inward movement is achieved by tightening the fastening device comprising bolt 78 and wing nut 80.

Although the lower end of shaft 72 is shown attached to shaft 16 by device 50 which also is used to secure spherical support device 30, it is to be realized that the level 74 can be attached to other parts of trimmer 10 without departing from the spirit and scope of the invention. In its simplest form, level 74 could be attached directly to the line trimmer without the need of attaching shaft 72.

It is possible that changes in configurations to other than those shown could be used but that which is shown is preferred and typical. Without departing from the spirit of this invention, various means of fastening the components together may be used.

It is therefore understood that although the present invention has been specifically disclosed with the preferred embodiment and examples, modifications to the design concerning sizing and shape will be apparent to those skilled in the art and such modifications and variations are considered to be equivalent to and within the scope of the disclosed invention and the appended claims.

I claim:

1. A support for a line trimmer comprising:
   a) a support shaft for attaching said support to said line trimmer, said support shaft having an upper end and a lower end;
   b) at least two arcuate tines, each with a first and second end, with each of said tines attached at said first end to said lower end of said support shaft and forming a confining space;
   c) a freely rotating sphere removably retained and rotating freely in any direction in said confining space with a minor portion of said sphere extending below said second ends of said tines.

2. The support according to claim 1 with said support shaft comprising first and second telescoping shafts and a means for securing said first and second telescoping shafts in fixed position with respect to each other.

3. The support according to claim 2 wherein one of said first and second shafts has at least one aperture therethrough and the other shaft has two or more apertures therethrough with one said aperture of said first shaft aligning with one said aperture of said second shaft and receiving a securing device therethrough.

4. The support according to claim 3 wherein said securing device is a bolt and nut.

5. The support according to claim 1 further comprising a securing device for attaching said upper end of said support shaft to said line trimmer.

6. The support according to claim 5 with said securing device comprising:
   a) a first plate with an inside surface;
   b) a second plate with an inside surface, said inside surface facing with said inside surface of said first plate,
      1) at least one of said inside surfaces of said first and said second plates having a first groove formed therein for receiving a portion of a shaft of said line trimmer;
      2) at least one of said inside surfaces of said first and said second plates having a second groove formed therein for receiving said upper end of said support shaft; and
   c) a device for securing said first and said second plates to said shaft of said line trimmer and to said upper end of said longitudinal support shaft.

7. The support according to claim 6 wherein said first and said second plates have aligning apertures therethrough and wherein said device for securing said first and said second plates to said shaft of said line trimmer and to said upper end of said support shaft is a bolt inserted through said aligning apertures and a nut.

8. The support according to claim 6 wherein at least one of said inside surfaces of said first and said second plates have a third groove aperture formed therein for receiving a lower end of a level indicator shaft of a line trimmer, line orientation indicator.

9. The support according to claim 1 further comprising a line trimmer, line orientation indicator attached to said line trimmer.

10. The support according to claim 9 with said line trimmer, line orientation indicator further comprising a base, a level attached to said base, and a level indicator shaft attached to said base.

11. The support according to claim 10 wherein said level indicator shaft is pivotally attached to said base.

12. A line trimmer and support comprising:
    a) a line trimmer;
    b) a support shaft attached to said line trimmer;
    c) at least two arcuate tines, each with a first and second end, with each of said tines attached at said first end to said lower end of said support shaft and forming a confining space;
    d) a freely rotating sphere removably retained and rotating freely in any direction in said confining space with a minor portion of said sphere extending below said second ends of said tines.

13. The line trimmer and support according to claim 12 further comprising a securing device for attaching said support shaft to said line trimmer.

14. The line trimmer and support according to claim 12 further comprising a line trimmer, line orientation indicator attached to said line trimmer.

* * * * *